United States Patent [19]

Suganuma

[11] Patent Number: 4,698,710
[45] Date of Patent: Oct. 6, 1987

[54] STEPPING MOTOR FOR A BELT DRIVE HEAD TRAVELLING MECHANISM FOR A FLOPPY DISK DRIVE

[75] Inventor: Kunio Suganuma, Tokyo, Japan

[73] Assignee: Citizen Watch Co., Ltd., Tokyo, Japan

[21] Appl. No.: 759,605

[22] Filed: Jul. 26, 1985

[30] Foreign Application Priority Data

Jul. 30, 1984 [JP] Japan .................. 59-160082

[51] Int. Cl.⁴ .................. G11B 5/55; G11B 21/08
[52] U.S. Cl. .................. 360/106; 360/109
[58] Field of Search .................. 360/106, 97–99, 360/109; 74/89.2, 89.21, 89.22; 310/49 R

[56] References Cited

U.S. PATENT DOCUMENTS

| | | | |
|---|---|---|---|
| 4,161,004 | 7/1979 | Dalziel | 360/106 |
| 4,170,146 | 10/1979 | Owens | 360/106 |
| 4,455,499 | 6/1984 | Sudler | 310/49 R |
| 4,528,473 | 7/1985 | Tezuka | 310/49 R |
| 4,599,666 | 7/1986 | Liu et al. | 360/106 |

FOREIGN PATENT DOCUMENTS 57-140959  8/1982  Japan .................. 74/89.22

*Primary Examiner*—John H. Wolff
*Assistant Examiner*—Matthew J. Bussan
*Attorney, Agent, or Firm*—Koda and Androlia

[57] ABSTRACT

A head travelling mechanism for a floppy disk drive including a stepping motor which is provided with a pair of stator coils arranged in both end sides of its casing. These two stator coils are not only supplied exciting electric current with predetermined combined phases to drive the feeding belt but also the direction of these two stator coils is in parallel with the travelling direction of the magnetic heads, and combination of exciting phases in the stator coils enables the inclination of the motor shaft of the stepping motor to be absorbed as a sideways motion of the feeding belt so that the travelling error of the magnetic heads can be reduced to the minimum.

1 Claim, 7 Drawing Figures

STEPPING MOTOR FOR A BELT DRIVE HEAD TRAVELLING MECHANISM FOR A FLOPPY DISK DRIVE

BACKGROUND OF THE INVENTION

1. Field of The Invention

This invention relates to a head travelling mechanism for a floppy disk drive, and more particularly to an improvement of a head travelling mechanism for a floppy disk drive which moves a carriage carrying magnetic heads by a belt through a stepping motor drive.

2. Description of The Prior Art

A floppy disk has been well known which includes a substrate of flexible plastic sheet coated with magnetic layers and is increasingly used over a broad range of applications for computers as data recording media in recent years.

In order to perform requested READ/WRITE actions from and to this kind of floppy disk a floppy disk drive is known which provides rotation of the floppy disk and movement of the magnetic heads to the requested track to perform READY/WRITE actions.

In ordinary cases the floppy disk drive comprises a DC servo-motor which rotates the floppy disk and a carriage to move the magnetic heads thereon to the requested track. A stepping motor is used to drive the carriage.

The driving force of the stepping motor is transmitted through a pulley mounted on its shaft and a feeding belt, an α belt for example, which is wound around the pulley. This provides a belt feeding mechanism in a limited space with excellent feeding accuracy. Particularly, since the α belt means is composed in such a way that the feeding belt is fixed to the carriage at its both ends and one run around the pulley and the stepping motor can be arranged in the vicinity of the carriage, as indicated in TOKUKAISHO 49-13140, the α belt means is extremely preferable for the small-sized floppy disk drive using the micro-floppy disk in the recent years.

In the recent years, however, the data storing density is remarkably increasing in the floppy disk drive and there is such a tendency that the distance between the tracks is getting finer. Thus, it has been requested that the heads must be travelled to the desired position with high accuracy.

Accordingly, in the belt feeding mechanism of the carriage using the stepping motor the minute feeding error in the carriage, which has not become a big problem in the prior art, could be a factor in off-track positioning of the heads, one of the problematical errors. Also of much concerned is a tilted shaft of the stepping motor when it is in the driving state.

In ordinary cases, in the stepping motor constructed with a plurality of electrode teeth of the stator cores determined by their magnetic poles in which the N pole and S pole are mixed in the circumferential direction, the motor has less inclination of its shaft and the rotor is always attracted to all directions, since the rotor mounted on the motor shaft has equal magnetic attraction in the circumferential direction. Thus, the motor shaft is received by bearings in a floating state, which is favorable as far as the tilting error on the motor shaft is concerned.

In order to form such stator magnetic field as is mentioned above a number of coils are required, and, generally speaking, it is desired to arrange a separate coil to each of the stator electrodes. This makes it impossible to design the device to be compact and small-sized.

Accordingly, in the case of the recent small-sized floppy disk drive, particularly the device driving the micro-floppy disk, the conventional stepping motor mentioned above cannot meet the requirement for a compact and small-sized floppy disk drive.

In order to improve the above mentioned stepping motor such a stepping motor is offered that a pair of stator coils are provided and the magnetic flux is distributed and supplied from those coils to a plurality of stator coils to design a small-sized devie. This system, however, cannot produce equal magnetic attraction in the circumferential direction but produces biased magnetic attraction to the rotor, depending on the combination of excitation phases in the stator coils, and the motor shaft is provided with the unignorable inclination.

SUMMARY OF THE INVENTION

Accordingly, it is an object of the present invention to provide a head travelling mechanism for a floppy disk drive which is improved to substantially delete a feeding error of magnetic heads by means of absorbing motor shaft inclination at the portion of a feeding belt through the best combination between a small-sized stepping motor with a pair of stator coils and a belt feeding structure moving a carriage, even if the rotor shaft inclination produced in the stepping motor mentioned above has a certain directional quality and such inclination itself cannot be deleted.

In keeping with the principle of the present invention, the object is accomplished with a head travelling mechanism for the floppy disk drive in which a pair of stator coils is not only arranged on the both end sides in the casing but also arranged such that the direction of these two stator coils is in parallel with the travelling direction of the magnetic heads so that the inclination of the motor shaft mentioned above can coincide with the direction of the sideways motion of the feeding belt and it can be firmly absorbed to obtain the desired head travelling action with high accuracy, as such sideways motion of the feeding belt does not contribute substantially to the feeding error of the magnetic heads.

BRIEF DESCRIPTON OF THE DRAWINGS

DETAILED DESCRIPTION OF THE EMBODIMENT

Figure 1:
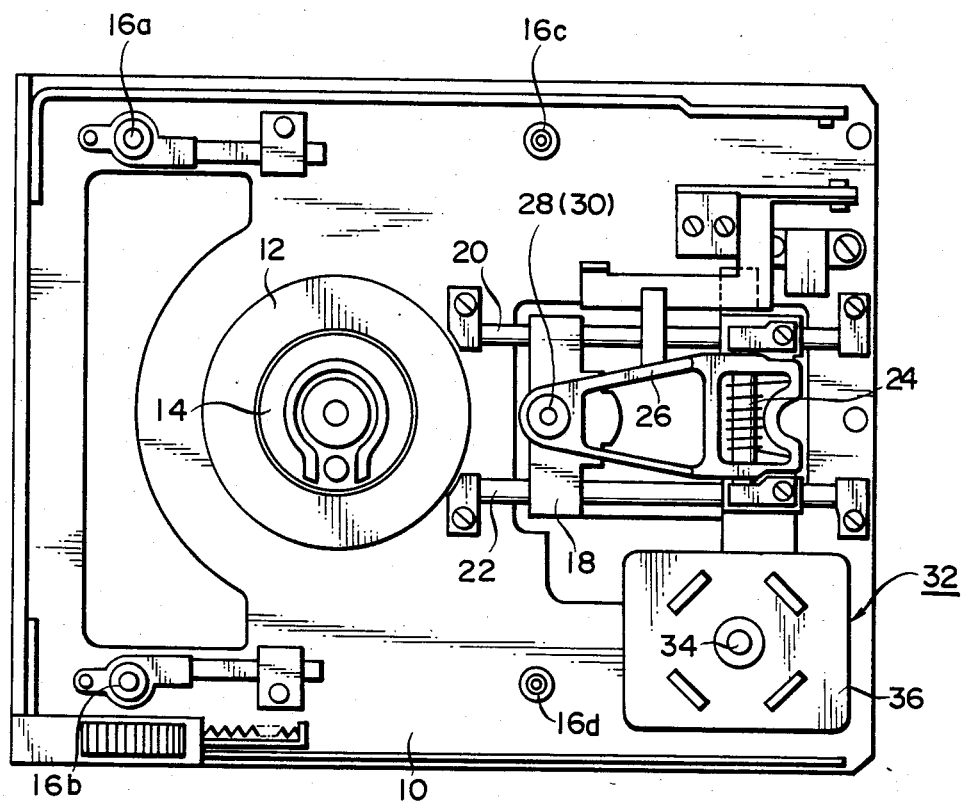
FIG. 1 is a plan view excluding a carriage to show a preferred embodiment of a floppy disk drive applying a head travelling mechanism in accordance with the teachings of the present invention.

FIG. 1 is an illustration, the interior appearance excluding a carriage of showing a preferred embodiment of a floppy disk drive in accordance with the teachings of the present invention. On a base plate 10 rotatably pivoted thereon is a DC motor 12 and a floppy disk, not illustrated, which is to be placed on its base rest 14 to be rotatably driven.

The device in the embodiment shows a micro floppy disk drive. The disk drive is encapsulated in a cartridge which is positioned by four positioning pins 16a, 16b, 16c and 16d stood on the base plate 10.

A carriage 18 is movably supported to face the rotary axis of the motor 12 in the circumferential direction and two guide rails 20 and 22 are fixed on the base plate 10. The carriage 18 is mounted on these guide rails 20 and 22 to freely move in the lateral direction. On the carriage 18 swingingly supported thereon are arms 26 with an arm shaft 24 at the center. A pair of magnetic heads 28 and 30 are respectively fixed on between the carriage and the arms 26 to perform a desired READ/WRITE action. This pair of magnetic heads 28 and 30 in the embodiment makes it possible to perform READ/WRITE action on both sides of the floppy disk. In this invention, however, it is preferable to have the magnetic head on one side and the compressing pad on the other side.

In order to move the carriage 18 or the magnetic heads 28 and 30 to the requested track of the floppy disk a stepping motor 32 is fixed on the base plate 10. Its motor shaft 34 and the carriage 18 mentioned above are combined with a well-known feeding belt, or an α belt, which will be described later, and the stepping action of the stepping motor 32 makes the carriage travel to the requested position.

Figure 2:
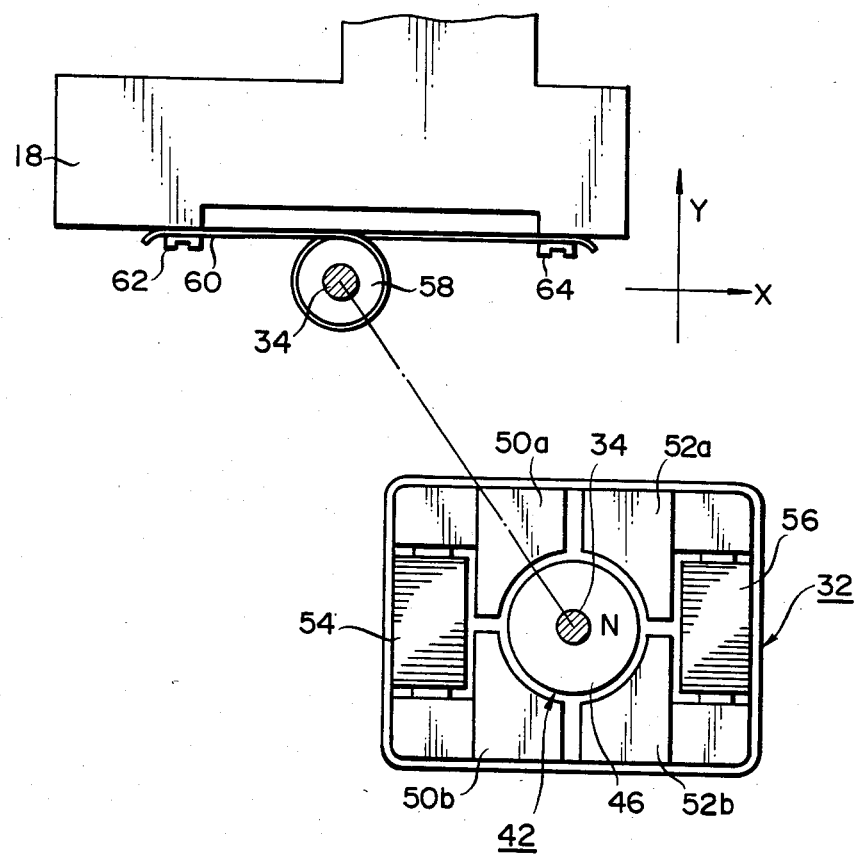
FIG. 2 is an illustration showing a principal portion of the head travelling mechanism in FIG. 1.
Figure 3:
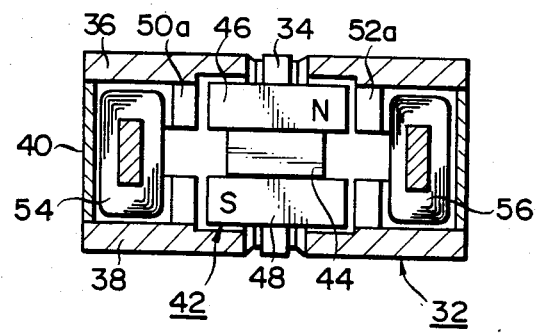
FIG. 3 is a longitudinal sectional view of a stepping motor utilized in FIG. 2.

In FIG. 2 shown therein is the internal composition of the above-mentioned stepping motor 32 and the belt feeding structure of the carriage 18, and FIG. 3 shows a longitudinal sectional view of the stepping motor 32. The illustrated stepping motor 32 is arranged in the casing consisting of a upper plate 36, a lower plate 38 and side plates 40, and the motor shaft 34 mentioned above is supported by bearings.

On the motor shaft 34 fixed thereon is a rotor 42 which comprises a permanent magnet 44 magnetized along its axis and yokes 46 and 48 fixed on its both ends, and on the side of these two yokes 46 and 48 formed thereon are rotor electrode teeth. In the illustrated embodiment the upper yoke 46 is the N pole and the lower yoke 48 the S pole.

Two pairs of stator cores 50a, 50b and 52a 52b are provided in the circumferential vicinity of the rotor 42 mentioned above to face the respective rotor electrodes, and stator coils 54 and 56 are respectively connected to two pairs of stator cores 50 and 52. Thus, the stepping motor 32 in the embodiment is provided with a pair of stator coils 54 and 56 on the both end sides of the casing. The rotor 42 is thus compared to be rotatably driven, and the stepping motor 32 can be designed in extremely small sizes.

In such a composition of the stator coils to be centered, however, the rotor shaft 34 is easily tilted as previously described. This tilted state is described in FIG. 4 by taking an example of the upper yoke 46. In Figure the bearing position 36a of the upper plate 36 is shown in the chained line around the motor shaft 34.

Figure 4B:
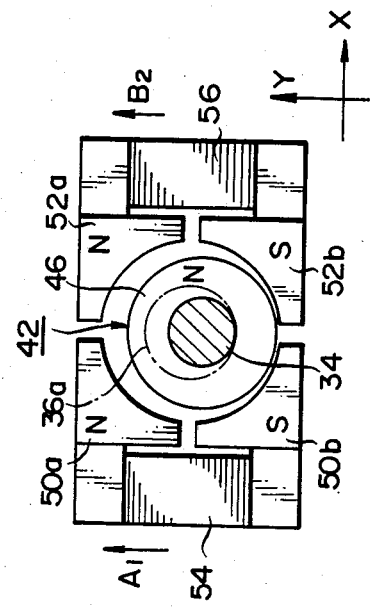
FIGS. 4A through D are illustrations showing the action of the stepping motor in the illustrated embodiment.
Figure 4D:
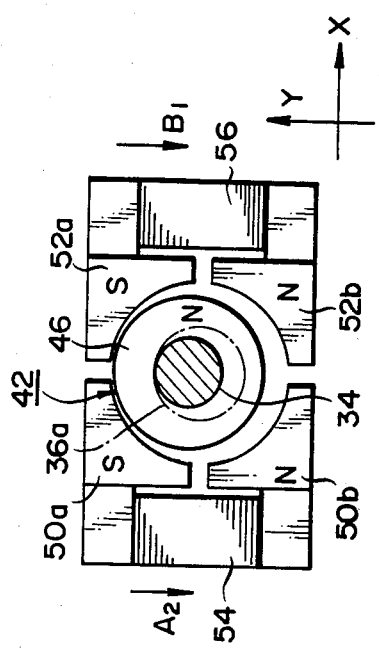
Figure 4A:
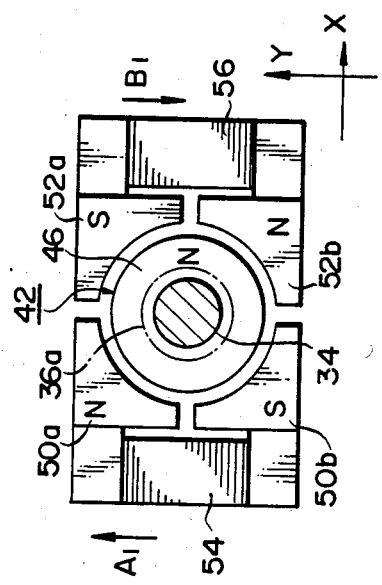

FIG. 4A shows excited electrodes of the respective stator cores 50 and 52 when electric current flows in the A1 and B1 directions through the stator coils 54 and 56 respectively. As shown in Figure, the rotor 42 receives repulsing or attracting magnetic force in the radial direction so that the motor shaft 34 is kept in a balanced state in the bearing 36a and positioned in a centrally supported state.

FIG. 4B shows the stator electrodes in such a state that the electric current flows in the directions of arrows A1 and B2 through both of the coils 54 and 56 respectively. As evident from the Figure, it is understood that the rotor 42 is attracted toward the −Y direction in the Figure so that the motor shaft 32 is tilted downward, since both the stator cores 50a and 52a in the +Y direction are magnetized to the N pole and the stator electrodes 50b and 52b are respectively magnetized to the S pole. At this time, furthermore, an opposite side acting force is added to the lower yoke 48, not illustrated, which is mounted on the lower portion of motor shaft 34, so that the inclination of the motor shaft 34 is further increased.

Figure 4C:
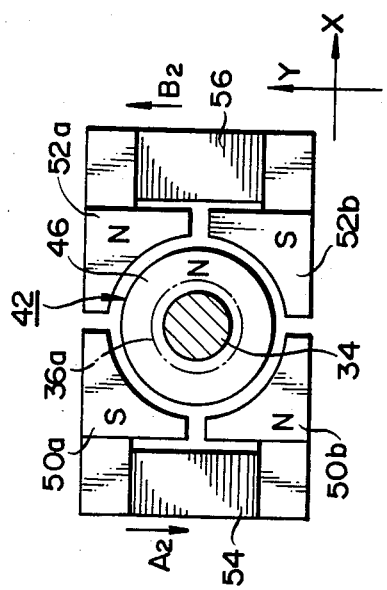

FIG. 4C shows such a state that the electric currents A2 and B2 respectively flow through the coils 54 and 56, in which case the motor shaft 34 is kept balanced in the magnetic field so that the inclination is limited in a small amount.

In the next stage, the electric current flows to the A2 and B1 directions through the coils 54 and 56 respectively, as is shown in FIG. 4D, so that the rotor 42 moves toward the +Y direction and the rotor 34 is much tilted.

As described hereinabove, it is inevitable that the combination of the excitation phases makes the rotor shaft of the stepping motor utilized in the invention to be unignorably tilted. In the present invention, however, in order to cope with this unfavorable situation, as shown in FIG. 2, the stator coils 54 and 56 are arranged in such a direction that the belt, the α belt 60 in the embodiment, is spanned extended to travel and drive the carriage 18. In the embodiment the α belt 60 extends along the X axis direction.

On the motor shaft 34 mounted thereon is the pulley 58 around which the α belt 60 is fixed at its center portion, and the α belt 60 extends and is fixed on its two ends between the fixing bolts 62 and 64 on the carriage 18.

Accordingly, as evident from the present invention described heretofore, the α belt 60 moves sideways to the tilting direction of the motor shaft, or Y direction, in accordance with the inclination of the motor shaft, but this sideways motion has little affect upon the movement of the carriage 18 toward the X direction, in other words, the travelling direction of the magnetic heads, and the inclination of the motor shaft mentioned above can be effectively absorbed. Thus, the inclination of the motor shaft 34 is limited to a minimum of the extending direction (X direction) of the α belt, and the belt can be fed with high accuracy, even if the above mentioned stepping motor 32 is used to feed the belt.

Incidentally, in the embodiment described hereinabove represented therein is the α belt, but it is evident that the present invention can be applied to other various belt pulley feeding mechanisms.

As described heretofore, according to the present invention, despite using the small-sized stepping motor in which a pair of stator coils are arranged in both end sides of its casing, the with the direction of these two stator coils in parallel with the belt feeding direction enables the inclination of the motor shaft to be absorbed as a sideways motion of the belt so that the heads can be travelled with high accuracy, which is of extreme advantage for the compact and small-sized floppy disk drive.

What is claimed is:

1. A magnetic head travelling device for a floppy disk drive characterized in that:

magnetic heads of said floppy disk drive are mounted on a carriage which is driven by a belt in a predetermined direction and said belt is driven by a shaft of a stepping motor;

a pair of stator coils are provided in said stepping motor and arranged in opposed end sides, relative to said predetermined direction, of a casing of said stepping motor respectively;

said stator coils are provided such that the plane of the coil winding is substantially in parallel with the direction of movement of said magnetic heads; and exciting current is supplied to said stator coils with predetermined phases and said motor shaft of said stepping motor is rotated by said exciting current such that inclination swinging motion of said motor shaft is a sideways motion relative to said belt;

whereby travelling error of said magnetic heads is reduced.

* * * * *